Aug. 1, 1933.   J. KUCHAR   1,920,571
COMBINED CHASSIS FRAME AND SUPPORT
Filed Feb. 21, 1930   4 Sheets-Sheet 2
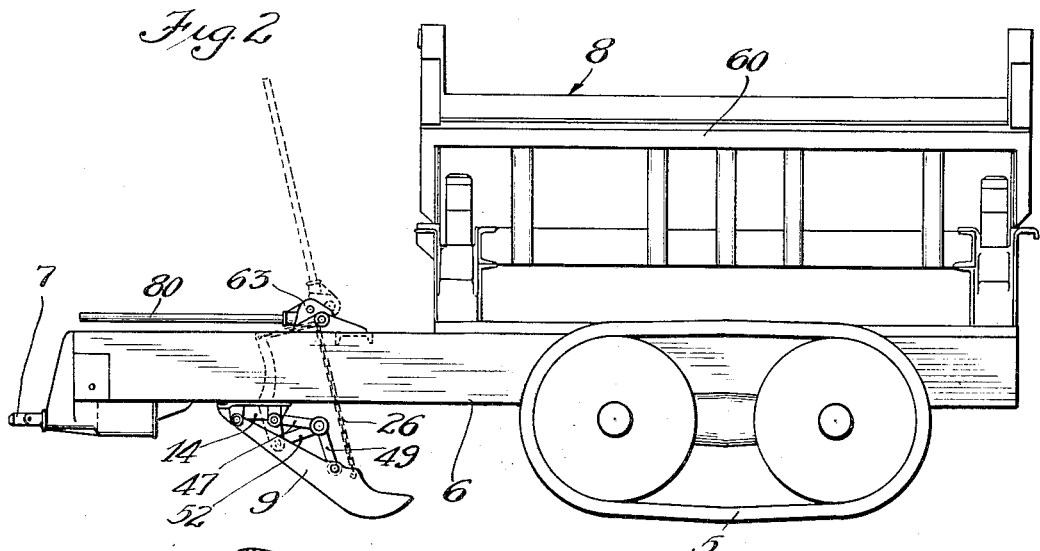
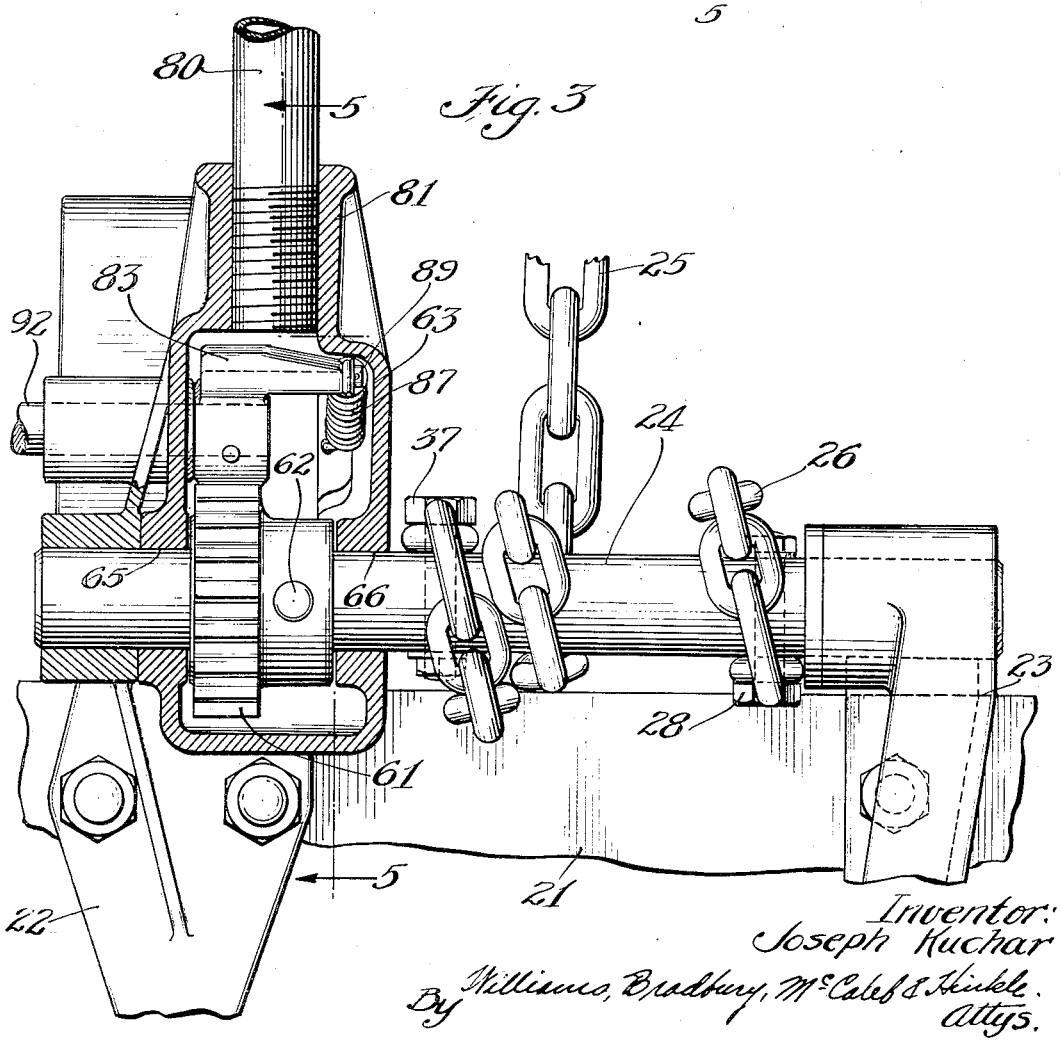
Inventor:
Joseph Kuchar
By Williams, Bradbury, McCaleb & Hinkle
Attys.

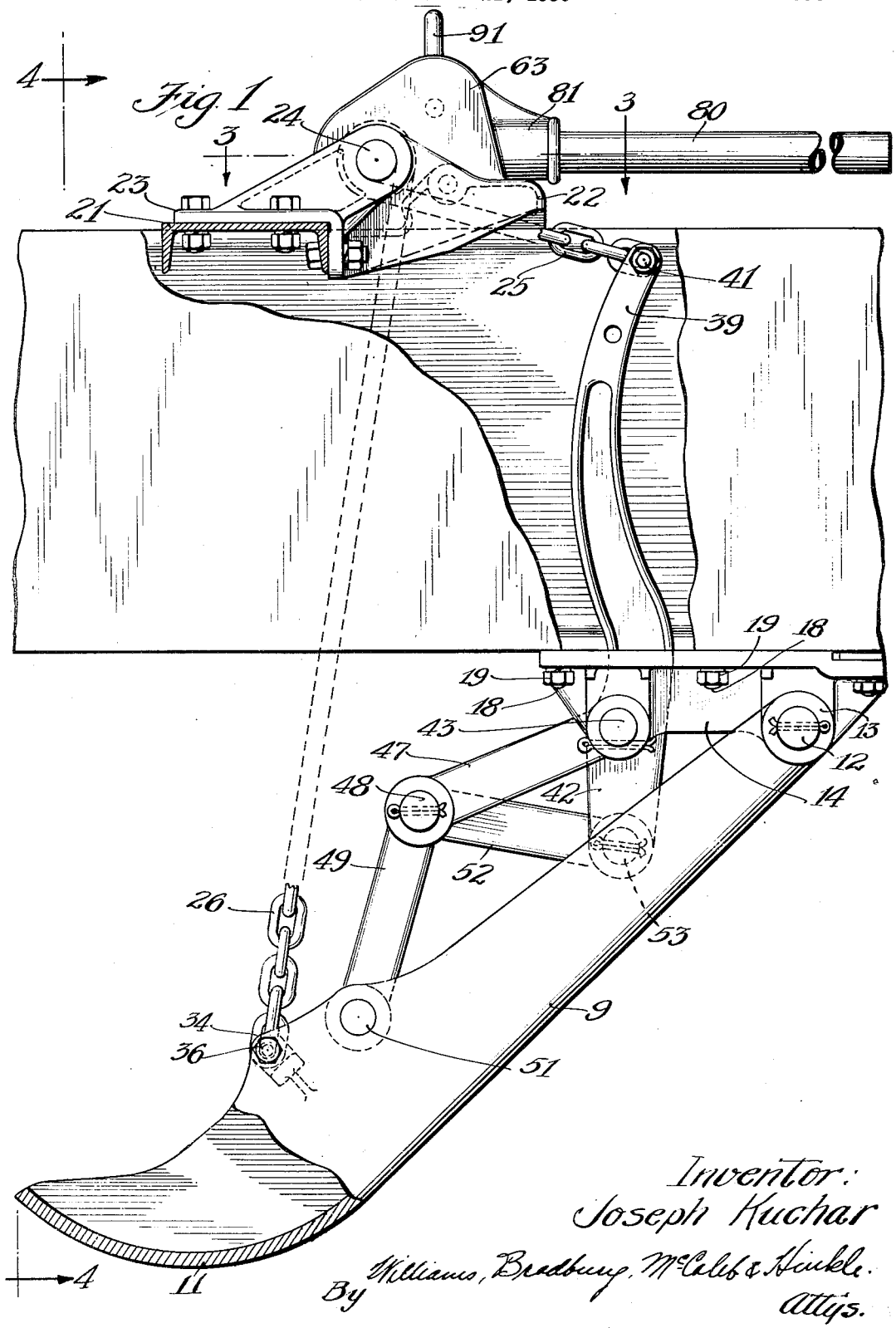

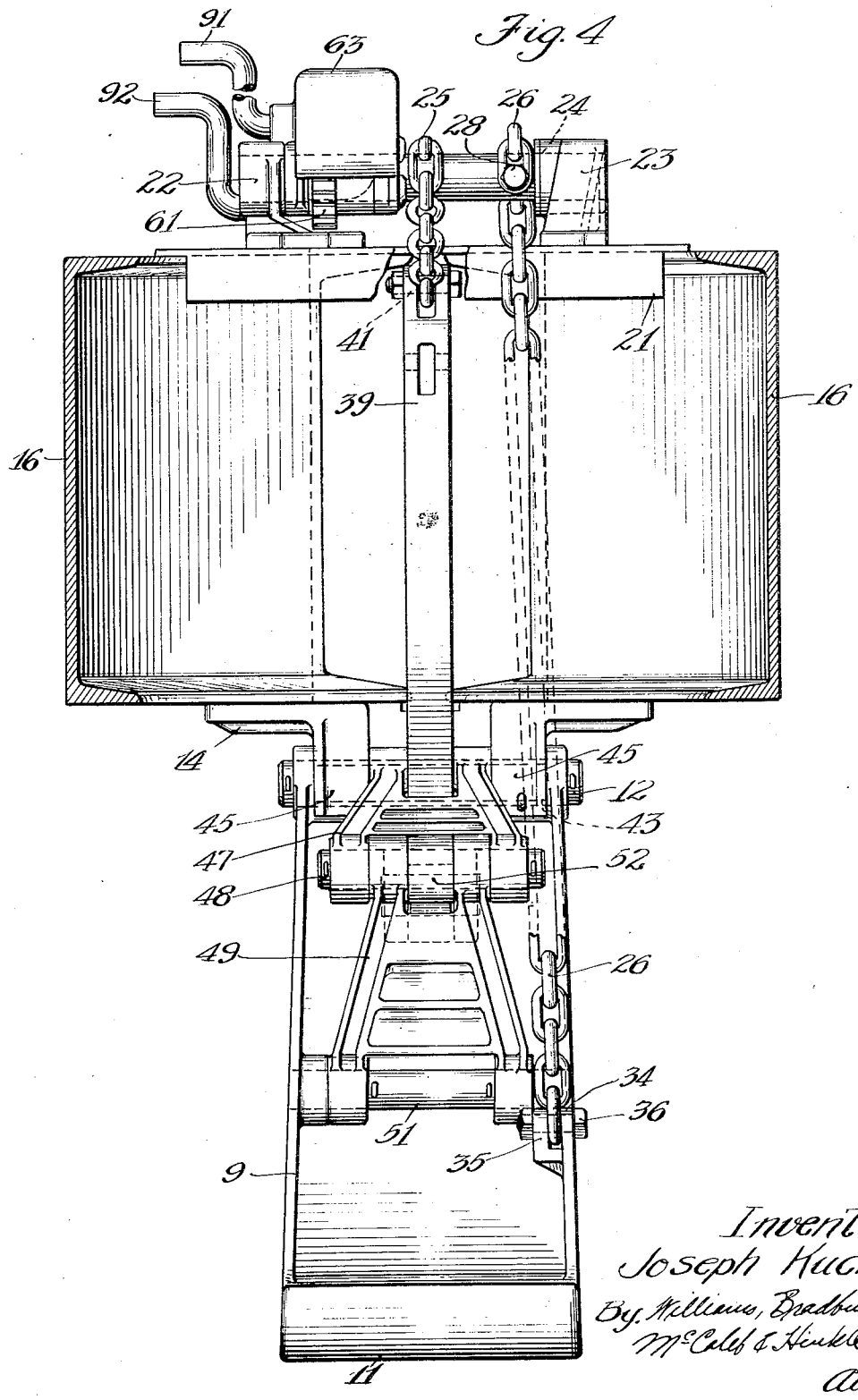

Aug. 1, 1933.   J. KUCHAR   1,920,571
COMBINED CHASSIS FRAME AND SUPPORT
Filed Feb. 21, 1930   4 Sheets-Sheet 4
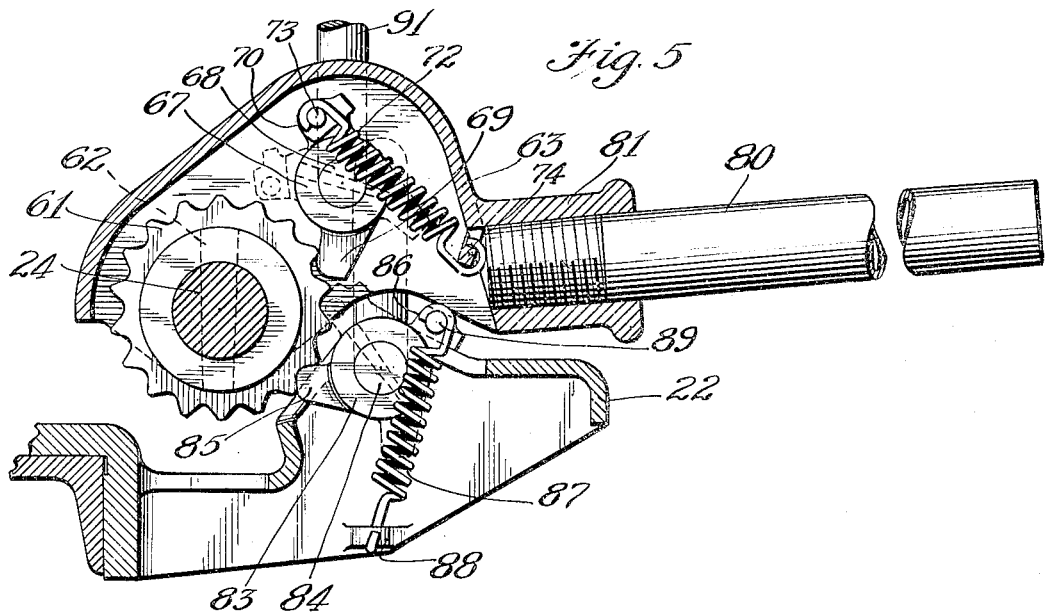
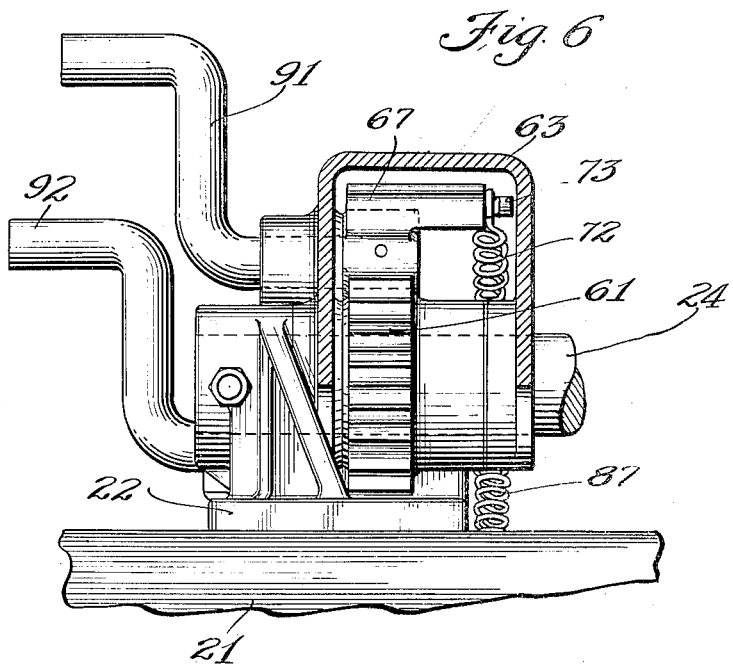
Inventor:
Joseph Kuchar
By Williams, Bradbury, McCaleb & Hinkle.
Attys.

Patented Aug. 1, 1933

1,920,571

UNITED STATES PATENT OFFICE 1,920,571

COMBINED CHASSIS FRAME AND SUPPORT

Joseph Kuchar, Chicago, Ill., assignor to Athey Truss Wheel Co., Chicago, Ill., a Corporation of Illinois Application February 21, 1930
Serial No. 430,157

11 Claims. (Cl. 280—33.1)

This invention relates to a combined chassis frame and support therefor and more particularly to an adjustable support or shoe combined and associated with a rigid portion of a vehicle frame such as a draw bar at the front end of a trailer for sustaining a portion of the weight when the traction vehicle is disconnected.

An object of this invention is the provision of such a device which is exceedingly rugged and durable.

Another object is the provision of a support having in combination mechanism adapted to forcibly lower and press the support into contact with the ground with sufficient force that the end of the trailer may be elevated or lowered thereby to aid in coupling to or uncoupling from a traction vehicle.

Another object is the provision of a device of the kind above identified which includes a ground contacting portion forming a sled-like engagement with the ground such that the trailer may be drawn over soft ground when the support is lowered, by means of a long rope extending from a distant point when the ground is too soft to support a traction vehicle.

Other objects and advantages will become apparent from the following description.

In the accompanying drawings:

Fig. 1 is a side elevation of a portion of a vehicle draw bar in combination with a supporting mechanism, portions being broken away to more clearly disclose my invention;

Fig. 2 is a similar view of that disclosed in Fig. 1 but on a smaller scale, showing my invention as associated with a trailer;

Fig. 3 is a horizontal section taken on the line 3—3 of Fig. 1;

Fig. 4 is a vertical section taken on the line 4—4 of Fig. 1;

Fig. 5 is a vertical section taken on the line 5—5 of Fig. 3; and

Fig. 6 is a view of the mechanism shown in Fig. 5 and taken on a plane at right angles thereto, parts being in section to more clearly disclose the mechanism within the casing.

Trailers of the type disclosed in Fig. 2 having a caterpillar tread member 5 and a relatively heavy chassis frame 6 are particularly adapted for use on soft ground. It is usual in the employment of such vehicles to attach a tractor or the like to the coupler 7 on the front end of the frame for moving the vehicle about. It, however, frequently happens that the ground is exceedingly soft, such as in excavations for highways and the like where such vehicles are extensively used, and although the trailer designated as a whole by the numeral 8, may be drawn over the ground without great difficulty it is sometimes exceedingly difficult to get a tractor close enough to attach it to the trailer since the tractor is relatively heavy and whether or not it is equipped with a caterpillar tread it may not be possible to use it in some sections of the field.

This invention is so designed as to be particularly useful under such circumstances, although it has many other uses which will hereinafter appear.

The support or shoe 9 is relatively wide, as shown in Fig. 4, having a convex lower end 11 which is adapted to engage the ground in the manner of a sled such that when it is in its lower position, as shown in Fig. 2, the trailer may be drawn over soft ground by use of a rope or the like extending from a distant point and the support is of such rigidity that it will remain fixed in position, even though the trailer may be drawn around sharp curves and the forward end of the frame 6 is pulled laterally. The support or shoe 9 is pivoted at its upper end by means of a pin 12 passing through depending lugs 13 on a bracket 14 which is secured to the channel bars 16 composing the frame 6 by means of bolts 18 and nuts 19, as shown in Fig. 1.

On the upper side of the channel bars 16 is fixed a downwardly disposed cross channel member 21 on which is secured brackets 22 and 23 in which the horizontally extending shaft 24 forms in effect a drum on which the chains 25 and 26 are adapted to be wound for the purpose of actuating the shoe. The chain 26 is fixed to the shaft 24 by a bolt 28 passing therethrough. The lower end of chain 26 is fixed between lugs 34 and 35 on the shoe 9 by means of a bolt 36, as shown in Fig. 4. The chain 25 is attached to the shaft 24 by a bolt 37. The other end of chain 25 is fixed to the upper end of an arm 39 by a bolt 41, as shown in Fig. 1. The arm 39 is pivoted by a bolt 43 passing through lugs 45 on the bracket 14 and includes a lower portion 42 depending below the bolt 43.

A link 47 pivoted by bolts 43 and 48 forms a portion of a toggle mechanism which also includes a link 49 pivoted to the shoe 9 by a bolt 51, and a link 52 pivoted to links 47 and 49 by bolt 48 and to the portion 42 of arm 39 by a bolt 53.

The chains 25 and 26 are wound on the shaft 24 in opposite directions such that when the shaft 24 is rotated in one direction one of the chains is wound thereon and the other is unwound and when the shaft is rotated in the other direction the reverse is true. The toggle mechanism consisting of the links above described, which are preferably broad and rigid as shown in Fig. 4, are so proportioned that upon actuation of the shaft 24 in either direction both of the chains remain substantially tight, i. e., neither of the chains becomes slackened and there is practically no lost motion in the operation of this device. Channel frame members 16 form the main frame of the chassis and under the main portion of the body 60 they are relatively widely spaced and toward the front end they are tapered toward each other, as shown in Fig. 4, for the purpose of forming a draw bar.

For the purpose of actuating the shaft 24 a ratchet wheel 61 is fixed thereon by a pin 62. A housing 63 is fitted on the shaft 24 having engagement therewith at 65 and 66, such that it may be oscillated thereon. A pawl 67 is pivotally secured to the housing 63 by a pin 68. The pawl 64 is provided with tooth engaging end portions 69 and 70, one of which is operable to rotate the ratchet wheel in one direction and the other to reverse the rotation of the ratchet wheel. A coil spring 72 is attached to the end 70 of the pawl by engagement about a pin 73. The opposite end of the spring 72 is secured on a lug 74 so positioned that by disengaging the end 69 from the teeth of wheel 61 the other end 70 passes into engagement with the teeth on wheel 61 and is held in engagement therewith by the spring 72, this latter position being shown in dotted outline in Fig. 5.

The full line position of the pawl 67, as shown in Fig. 5, is such that by the oscillation of the handle 80 which is fixed in a boss 81 of the casing 63, the ratchet wheel is rotated in a clockwise direction for unwinding one of the chains and winding the other chain on the shaft 24 whereby the shoe 9 is actuated. In order that the shoe may be actuated against resistance such as its own weight or the weight of the draw bar a dog 83 has been provided which is pivoted on the bracket 22 by a bolt 84. This dog is provided with two end portions 85 and 86 which are engageable with the teeth on the ratchet wheel 61 and may be oscillated from the position shown in full lines to bring the end portion 86 into engagement with the ratchet wheel 61, the dog being held in either of said positions by a coil spring 87, having one end engaging lug 88 on the bracket 22 and the other end engaging a pin 89 on one end of the dog. When the pawl 67 is oscillated to the position shown in dotted lines by means of the reversing handle 91 and when the dog 83 is oscillated by means of the reversing handle 92 to bring the end portion 86 into engagement with the ratchet wheel 61, the oscillation of the operating handle 80 will reverse the rotation of the shaft 24 and actuate the shoe 9 in a direction opposite to that in which it would be actuated when the dog and pawl are in the positions shown in full lines in Fig. 5.

In coupling a tractor to the coupler 7 on the chassis it may be found that the coupler 7 is too high. Since the reversal of both the dog 83 and the pawl 67 when the shoe 9 is supporting a weight, would allow the front end of the frame 6 to fall to the ground, it is necessary to gradually adjust the front end downwardly, which is accomplished by first pressing down on the hand lever 80 while the pawl is in the full line position shown in Fig. 5. The dog 83 must then be released by means of the handle 92 and the hand lever 80 permitted to move upwardly enough to gain proper adjustment. The dog 83 must then be reengaged in the position shown in full lines in Fig. 5.

From the above description it will be readily understood that the shoe 9 may be lowered or raised gradually and accurately to any desired position whether or not it is sustaining weight.

Although I have described one specific form of my invention it will be readily apparent to those skilled in the art that many other forms of shoes and lifting mechanisms may be designed which when combined and associated with the draw bar of a trailer will function in substantially the manner I have hereinbefore set forth and I do not, therefore, wish to be limited to the specific form illustrated and described in this specification except as set forth in the appended claims.

I claim as my invention:

1. In combination, a vehicle chassis frame, a support therefor, an adjustable mechanism for forcibly raising and lowering said support, means for holding said mechanism in adjusted position, said mechanism comprising a shaft journalled on said frame, means for rotating said shaft, and a plurality of chains operably connecting said support to said shaft, said chains being respectively adapted to raise and lower said support upon rotation of said shaft in opposite directions.

2. In combination, a vehicle chassis frame, a support therefor, an adjustable mechanism for forcibly raising and lowering said support, means for holding said support in adjusted position, said mechanism comprising a shaft journalled on said frame, pawl and ratchet mechanism for rotating said shaft, and a plurality of chains operably connecting said support to said shaft, said chains being respectively adapted to raise and lower said support upon rotation of said shaft in opposite directions.

3. In combination, a vehicle chassis frame, a support therefor, an adjustable mechanism for forcibly raising and lowering said support, means for holding said support in adjusted position, said mechanism comprising a shaft journalled on said frame, means for rotating said shaft, and a plurality of chains operably connecting said support to said shaft, said chains being respectively adapted to forcibly raise and lower said support upon rotation of said shaft in opposite directions, said support comprising a broad channel shaped member having one end pivoted to said frame, and comprising a convex ground engaging portion on its lower end.

4. In combination with a trailer draw bar, of a supporting shoe therefor, a horizontally journalled shaft mounted on said draw bar, a ratchet wheel fixed for rotation with said shaft, a reversible pawl engageable with said ratchet wheel for actuating the same, means for actuating said pawl, a toggle mechanism connected with said shoe and operably attached to said shaft whereby it is actuated, a chain having one end secured intermediate the ends of said shoe, the other end of said chain being secured to said shaft for lifting said shoe, and a reversible dog engageable with said ratchet wheel for holding it in any adjusted position.

5. In combination with a tractor draw bar, of a support therefor, a shaft journaled on said draw bar, a ratchet wheel fixed on said shaft, a pawl engageable with said ratchet wheel for selectively actuating it in either direction, means for actuating said pawl, link mechanism on said support, means operably connecting said link mechanism with said shaft, for actuating the same to forcibly lower said support into supporting position.

6. In combination with a tractor draw bar, of a support therefor, a shaft journaled on said draw bar, a ratchet wheel fixed on said shaft, a pawl engageable with said ratchet wheel for selectively actuating it in either direction, means for actuating said pawl, link mechanism on said support, means operably connecting said link mechanism with said shaft, for actuating the same to forcibly lower said support into supporting position, and other means connecting said support with said shaft for forcibly lifting said support.

7. In combination with a tractor draw bar, of a support therefor, a shaft journaled on said draw bar, a ratchet wheel fixed on said shaft, a pawl engageable with said ratchet wheel for selectively actuating it in either direction, means for actuating said pawl, link mechanism on said support, means operably connecting said link mechanism with said shaft and a chain directly connecting said support to said shaft, whereby actuation of said shaft is adapted to selectively and forcibly raise and lower said support.

8. In combination with a tractor draw bar, of a support therefor, a shaft journaled on said draw bar, a ratchet wheel fixed on said shaft, a pawl engageable with said ratchet wheel for selectively actuating it in either direction, means for actuating said pawl, link mechanism on said support, means operably connecting said link mechanism with said shaft, for actuating the same to forcibly lower said support into supporting position, and a reversible dog engageable with said ratchet wheel to selectively prevent rotation of said wheel in either direction.

9. In combination with a tractor draw bar, of a support therefor, a shaft journaled on said draw bar, a ratchet wheel fixed on said shaft, a pawl engageable with said ratchet wheel for selectively actuating it in either direction, means for actuating said pawl, link mechanism on said support, means operably connecting said link mechanism with said shaft and a chain directly connecting said support to said shaft, whereby actuation of said shaft is adapted to selectively and forcibly raise and lower said support, and a reversible dog engageable with said ratchet wheel to selectively prevent rotation of said wheel in either direction.

10. In combination, a vehicle chassis frame, a support therefor pivotally mounted on said frame, an adjustable mechanism for forcibly raising and lowering said support, means for holding said mechanism in adjusted position, said mechanism comprising a shaft journaled on said frame, means for rotating said shaft, operative means connecting said shaft and said support so as to forcibly lower same when said shaft is actuated in one direction, and separate operative means connecting said shaft to said support for raising same when the shaft is actuated in the opposite direction, the last said operative means being released by the first said operation and the first said operative means being released by the last said operation.

11. In combination, a vehicle chassis frame, a support therefor pivotally mounted on said frame, actuating means mounted on the frame and adapted to be operated in either direction, a linkage adapted to forcibly lower said shoe, said linkage being adapted to be operated by said actuating means when operating in one direction, and separate tension means adapted to be operated by said actuating means when operating in the opposite direction, to elevate the shoe, said tension means being released by the first said operation and the linkage being released by the last said operation.

JOSEPH KUCHAR.